United States Patent [19]
Tomotsu et al.

[11] Patent Number: 5,905,126
[45] Date of Patent: *May 18, 1999

[54] PROCESS AND CATALYST FOR PRODUCING STYRENIC POLYMER

[75] Inventors: Norio Tomotsu; Mizutomo Takeuchi, both of Ichihara, Japan

[73] Assignee: Idemitsu Kosan Co., Ltd., Tokyo, Japan

[ * ] Notice: This patent is subject to a terminal disclaimer.

[21] Appl. No.: 08/946,791

[22] Filed: Oct. 8, 1997

Related U.S. Application Data

[63] Continuation of application No. 08/612,077, Mar. 7, 1996, Pat. No. 5,786,403, which is a continuation of application No. 08/131,616, Oct. 5, 1993, abandoned.

[30] Foreign Application Priority Data

Oct. 8, 1992 [JP] Japan .................................. 4-270228

[51] Int. Cl.$^6$ ............................. C08F 4/642; C08F 12/08
[52] U.S. Cl. ......................... 526/153; 526/114; 526/115; 526/119; 526/132; 526/133; 526/151; 526/160; 526/346; 502/103; 502/113; 502/124; 502/132; 502/153; 502/154

[58] Field of Search .................................... 526/114, 115, 526/119, 132, 133, 151, 153, 160, 346; 502/102, 103, 113, 124, 132, 154, 171, 153, 114

[56] References Cited

U.S. PATENT DOCUMENTS 5,171,919  12/1992  Watanabe et al. ........................ 585/523
5,250,629  10/1993  Tani et al. ............................ 525/267 X

*Primary Examiner*—Fred Teskin
*Attorney, Agent, or Firm*—Oblon, Spivak, McClelland, Maier & Neustadt, P.C.

[57] ABSTRACT

There is disclosed a process for producing a styrenic polymer which comprises polymerizing at least one styrenic monomer by the use of a polymerization catalyst comprising in combination (A) at least one transition metal compounds, (B) an aluminoxane, (C) a coordination complex compound comprising a cation and an anion in which a plurality of radicals are bonded to a metal and (D) an organoaluminum compound. The above process is capable of producing a styrenic polymer which has high degree of syndiotactic configuration and a wide range of molecular weight distribution and is minimized in residual metallic components at a low production cast with a high efficiency.

5 Claims, No Drawings

PROCESS AND CATALYST FOR PRODUCING STYRENIC POLYMER

This is a Continuation of application Ser. No. 08/612,077 filed on Mar. 7, 1996, U.S. Pat. No. 5,786,403, which is a continuation of Ser. No. 08/131,616 filed Oct. 5, 1993, now abandoned.

BACKGROUND OF THE INVENTION

1. Field of the Invention

The present invention relates to an improved process for producing a styrenic polymer. More particularly it pertains to a process for producing a styrenic polymer which has high degree of syndiotactic configuration and a wide range of molecular weight distribution and is reduced in residual metallic components at a low production cost with a high efficiency.

2. Description of Related Art

There have heretofore been known the processes for producing high-performance styrenic polymer having high degree of syndiotactic configuration in high yield by allowing a reaction product of an aluminoxane with a transition metal complex to act on styrene. (Refer to Japanese Patent Application Laid-Open Nos. 187708/1987, 179906/1988, 241009/1988, etc.). However, the styrenic polymer produced by any of the above-disclosed processes involves the problem of moldability due to the usually narrow range of molecular weight distribution. Accordingly there is desired a styrenic polymer which has high degree of syndiotactic configuration and besides a wide range of molecular weight distribution.

In order to produce such a styrenic polymer having a wide range of molecular weight distribution, there has heretofore been employed a method in which a high molecular styrenic polymer and a low molecular styrenic polymer are mixed with each other by melt kneading or the like to expand the range of molecular weight distribution. However, the aforesaid method involves the problem of requiring much labor and effort for uniform mixing.

There is also known a method of expanding the molecular weight distribution by the use of a plurality of transition metal compounds and an aluminoxane. (Refer to Japanese Patent Application Laid-Open No. 119006/1991). Nevertheless the above-mentioned method suffers the disadvantage that a large requirement of an aluminoxane increases the catalyst cost and the amount of residual metallic components is excessive making it unserviceable unless deashing is put into practice.

Under such circumstances it is an object of the present invention to provide a process for producing a styrenic polymer which has high degree of syndiotactic configuration and a wide range of molecular weight distribution and is reduced in residual metallic components at a low production cost with a high efficiency.

SUMMARY OF THE INVENTION

As the result of intensive research and investigation accumulated by the present inventors in order to attain the above-mentioned object, it has been found, in the combined polymerization catalyst comprising a transition metal compound, an aluminoxane, a specific ion complex and an organoaluminum compound, that the incorporation of said organoaluminum compound causes the polymer portion produced by the aluminoxane to shift to the side of the lower molecular weight but does not cause the polymer portion produced by the ion complex to shift to said side and therefore the combined use of the aluminoxane, the ion complex and the organoaluminum compound can expand the range of molecular weight distribution; the combined use of the aluminoxane and the ion complex can reduce the requirement of the expensive aluminoxane as compared with the conventional methods; the use of a plurality of transition metal compounds can set the molecular weight distribution at a desired value thereby enabling the range of said distribution to be expanded; and after all the use of said polymerization catalyst can attain the object of the present invention. The present invention has been accomplished on the basis of the above-mentioned finding and information.

Specifically the present invention provides a process for producing a styrenic polymer which comprises polymerizing at least one styrenic monomer by the use of a polymerization catalyst comprising in combination (A) a transition metal compound, (B) an aluminoxane, (C) a coordination complex compound comprising a cation and an anion in which a plurality of radicals are bonded to a metal and (D) an organoaluminum compound, and at the same time, a process for producing a styrenic polymer which comprises polymerizing at least one styrenic monomer by the use of a polymerization catalyst comprising in combination (A) a plurality of transition metal compounds and the aforesaid components (B) an aluminoxane, (C) a coordination complex compound comprising a cation and an anion in which a plurality of radicals are bonded to a metal and (D) an organoaluminum compound.

DESCRIPTION OF PREFERRED EMBODIMENT

In the process according to the present invention, the combination of the components (A), (B), (C) and (D) is employed as the polymerization catalyst. Various transition metal compounds are available as the component (A) and exemplified by a compound of a group 3 to 6 metal of the Periodic Table and a compound of lanthanum series metal, of which is preferable a compound of a group 4 metal (titanium, zirconium, hafnium, vanadium, etc.). Various titanium compounds can be used and a preferred example is at least one compound selected from the group consisting of titanium compounds and titanium chelate compounds represented by the general formula:

$$\mathrm{TiR^1_a R^2_b R^3_c R^4_{4-(a+b+c)}} \tag{I}$$

or

$$\mathrm{TiR^1_d R^2_e R^3_{3-(d+e)}} \tag{II}$$

wherein $R^1$, $R^2$, $R^3$ and $R^4$ are each a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group or a halogen atom; a, b and c are each an integer from 0 to 4; and d and e are each an integer from 0 to 3.

$R^1$, $R^2$, $R^3$ and $R^4$ in the general formulae (I) and (II) each represent a hydrogen atom, an alkyl group having 1 to 20 carbon atoms (specifically, methyl group, ethyl group, propyl group, butyl group, amyl group, isoamyl group, isobutyl group, octyl group and 2-ethylhexyl group), an alkoxy group having 1 to 20 carbon atoms (specifically, methoxy group, ethoxy group, propoxy group, butoxy group, amyloxy group, hexyloxy group, and 2-ethylhexyloxy group), an aryl group having 6 to 20 carbon atoms, an alkylaryl group, an arylalkyl group (specifically, phenyl group, tolyl group, xylyl group and benzyl group), an acyloxy group having 1 to 20 carbon atoms (specifically, heptadecylcarbonyloxy group), a cyclopentadienyl group, a substituted cyclopentadienyl group (specifically, methylcyclopentadienyl group, 1,2-dimethylcyclopentadienyl group and pentamethylcyclopentadienyl group), an indenyl group or a halogen atom (specifically, chlorine, bromine, iodine and fluorine). These $R^1$, $R^2$, $R^3$, $R^4$ may be the same as or different from each other. Furthermore, a, b and c are each an integer from 0 to 4, and d and e are each an integer from 0 to 3.

More desirable titanium compounds include a titanium compound represented by the formula:

TiRXYZ  (III)

wherein R represents a cyclopentadienyl group, a substituted cyclopentadienyl group or an indenyl group;

X, Y, and Z, independently of one another, are a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom.

The substituted cyclopentadienyl group represented by R in the above formula is, for example, a cyclopentadienyl group substituted by at least one of an alkyl group having 1 to 6 carbon atoms, more specifically, methylcyclopentadienyl group, 1,3-dimethylcyclopentadienyl group, 1,2,4-trimethylcyclopentadienyl group, 1,2,3,4-tetramethylcyclopentadienyl group, pentamethylcyclopentadienyl group or the like. In addition, X, Y, and Z are each independently a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxy group having 1 to 12 carbon atoms (specifically, methoxy group, ethoxy group, propoxy group, butoxy group, amyloxy group, hexyloxy group, octyloxy group and 2-ethylhexyl group), an aryl group having 6 to 20 carbon atoms (specifically, phenyl group and naphthyl group), an aryloxy group having 6 to 20 carbon atoms (specifically, phenoxy group), an arylalkyl group having 6 to 20 carbon atoms (specifically, benzyl group) or a halogen atom (specifically, chlorine, bromine, iodine and fluorine).

Specific examples of the titanium compound represented by the general formula (III) include
cyclopentadienyltrimethyltitanium,
cyclopentadienyltriethyltitanium,
cyclopentadienyltripropyltitanium,
cyclopentadienyltributyltitanium,
cyclopentadienyltrichlorotitanium,
methylcyclopentadienyltrimethyltitanium,
1,3-dimethylcyclopentadienyltrimethyltitanium,
pentamethylcyclopentadienyltrimethyltitanium,
pentamethylcyclopentadienyltriethyltitanium,
pentamethylcyclopentadienyltripropyltitanium,
pentamethylcyclopentadienyltributyltitanium,
pentamethylcyclopentadienyltrichlorotitanium,
cyclopentadienylmethyltitanium dichloride,
cyclopentadienylethyltitanium dichloride,
pentamethylcyclopentadienylmethyltitanium dichloride,
pentamethylcyclopentadienylethyltitanium dichloride,
cyclopentadienyldimethyltitanium monochloride,
cyclopentadienyldiethyltitanium monochloride,
cyclopentadienyltitanium trimethoxide,
cyclopentadienyltitanium triethoxide,
cyclopentadienyltitanium tripropoxide,
cyclopentadienyltitanium triphenoxide,
pentamethylcyclopentadienyltitanium trimethoxide,
pentamethylcyclopentadienyltitanium triethoxide,
pentamethylcyclopentadienyltitanium tripropoxide,
pentamethylcyclopentadienyltitanium tributoxide,
pentamethylcyclopentadienyltitanium triphenoxide,
cyclopentadienyltitanium trichloride,
pentamethylcycloentadienyltitanium trichloride,
cyclopentadienylmethoxytitanium dichloride,
cyclopentadienyldimethoxytitanium chloride,
pentamethylcyclopentadienylmethoxytitanium dichloride,
cyclopentadienyltribenzyltitanium,
pentamethylcyclopentadienylmethyldiethoxytitanium,
indenyltitanium trichloride, indenyltitanium trimethoxide, indenyltitanium triethoxide, indenyltrimethyltitanium and indenyltribenzyltitanium.

Of these titanium compounds, a compound not containing a halogen atom is preferred and a titanium compound having one πelectron type ligand is particularly desirable.

Furthermore, a condensed titanium compound represented by the general formula may be used as the titanium compound.

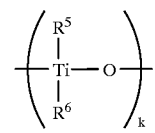
(IV)

wherein $R^5$ and $R^6$ each represent a halogen atom, an alkoxy group having 1 to 20 carbon atoms or an acyloxy group; and k is an integer from 2 to 20.

Furthermore, the above titanium compounds may be used in the form of a complex formed with an ester, an ether or a phosphine.

The trivalent titanium compound represented by the formula (IV) typically includes a trihalogenated titanium such as titanium trichloride; and a cyclopentadienyltitanium compound such as cyclopentadienyltitanium dichloride, and also those obtained by reducing a tetravalent titanium compound. These trivalent titanium compounds may be used in the form of a complex formed with an ester, an ether or a phosphine.

In addition, examples of the zirconium compound used as the transition metal compound include tetrabenzylzirconium, zirconium tetraethoxide, zirconium tetrabutoxide, bisindenylzirconium dichloride, triisopropoxyzirconium chloride, zirconium benzyl dichloride and tributoxyzirconium chloride. Examples of the hafnium compound include tetrabenzylhafnium, hafnium tetraethoxide and hafnium tetrabutoxide. Examples of the vanadium compound include vanadyl bisacetylacetonato, vanadyl triacetylacetonato, vanadyl triethoxide and vanadyl tripropoxide. Of these transition metal compounds, the titanium compounds are particularly suitable.

Aside from the foregoing, the transition metal compounds constituting the component (A) of the catalyst include the transition metal compound with two ligands having conjugated π electrons, for example, at least represented by the general formula:

$MR^7R^8R^9R^{10}$  (V)

wherein M is titanium, zirconium or hafnium; $R^7$ and $R^8$ are each a cyclopentadienyl group, substituted cyclopentadienyl group, indenyl group or fluorenyl group; and $R^9$ and $R^{10}$ are each a hydrogen atom, a halogen atom, hydrocarbon radical having 1 to 20 carbon atoms, alkoxy group having 1 to 20 carbon atoms, amino group or thioalkoxyl group having 1 to 20 carbon atoms, but $R^7$ and $R^8$ may be each crosslinked by a hydrocarbon radical having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms.

In more detail, each of $R^7$ and $R^8$ in the general formula (V) designates a cyclopentadienyl group, substituted cyclopentadienyl group, more specifically, methylcyclopentadienyl group; 1,3-dimethylcyclopentadienyl group; 1,2,4-trimethylcyclopentadienyl group; 1,2,3,4-tetramethylcyclopentadienyl group; pentamethylcyclopentadienyl group; trimethylsilylcyclopentadienyl group; 1,3-di(trimethylsilyl)cyclopentadienyl group; 1,2,4-tri(trimethylsilyl)cyclopentadienyl group; tert-butylcyclopentadienyl group; 1,3-di(tert-butyl)cyclopentadienyl group; 1,2,4-tri(tert-butyl)cyclopentadienyl group or the like, indenyl group, substituted indenyl group, more specifically, methylindenyl group; dimethylindenyl group; trimethylindenyl group or the like, fluorenyl group, or substituted fluorenyl group such as methylfluorenyl group, and may be the same or different and crosslinked by a alkylidene group having 1 to 5 carbon atoms, more specifically, methine group; ethylidene group; propylidene group; dimethylcarbyl.group or the like, or an alkylsilyl group having 1 to 20 carbon atoms and 1 to 5 silicon atoms, more specifically, dimethylsilyl group; diethylsilyl group; dibenzylsilyl group or the like. Each of $R^9$ and $R^{10}$ independently indicates, as described above but more specifically, a hydrogen atom; an alkyl group having 1 to 20 carbon atoms such as methyl group, ethyl group, propyl group, n-butyl group, isobutyl group, amyl group, isoamyl group, octyl group or 2-ethylhexyl group; an aryl group having 6 to 20 carbon atoms such as phenyl group or naphthyl group; an arylalkyl group having 7 to 20 carbon atoms such as benzyl group; an alkoxyl group having 1 to 20 carbon atoms such as methoxyl group, ethoxyl group, propoxyl group, butoxyl group, amyloxyl group, hexyloxyl group, octyloxyl group or 2-ethylhexyloxyl group; an aryloxyl group having 6 to 20 carbon atoms such as phenoxyl group; an amino group; or a thioalkoxyl group having 1 to 20 carbon atoms.

Specific examples of the transition metal compounds represented by the general formula (V) include
bis(cyclopentadienyl)dimethyltitanium;
bis(cyclopentadienyl)diethyltitanium;
bis(cyclopentadienyl)dipropyltitanium;
bis(cyclopentadienyl)dibutyltitanium;
bis(methylcyclopentadienyl)dimethyltitanium;
bis(tert-butylcyclopentadienyl)dimethyltitanium;
bis(1,3-dimethylcyclopentadienyl)dimethyltitanium;
bis(1,3-di-tert-butylcyclopentadienyl)dimethyltitanium;
bis(1,2,4-trimethylcyclopentadienyl)dimethyltitanium;
bis(1,2,3,4-tetramethylcyclopentadienyl)dimethyltitanium;
bis(pentamethylcyclopentadiemyl)dimethyltitanium;
bis(trimethylsilylcyclopentadienyl)dimethyltitanium;
bis(1,3-di(trimethylsilyl)cyclopentadienyl) dimethyltitanium;
bis(1,2,4-tri((trimethylsilyl)cyclopentadienyl) dimethyltitanium; bis(indenyl)dimethyltitanium;
bis(fluorenyl)dimethyltitanium;
methylenebis(cyclopentadienyl)dimethyltitanium;
ethylidenebis(cyclopentadienyl)dimethyltitanium;
methylenebis(2,3,4,5-tetramethylcyclopentadienyl) dimethyltitanium;
ethylidenebis(2,3,4,5-tetramethylcyclopentadienyl) dimethyltitanium;
dimethylsilylbis(2,3,4,5-tetramethylcyclopentadienyl) dimethyltitanium;
methylenebisindenyldimethyltitanium;
ethylidenebisindenyldimethyltitanium;
dimethylsilylbisindenyldimethyltitanium;
methylenebisfluorenyldimethyltitanium;
ethylidenbisfluorenyldimethyltitanium;
dimethylsilylbisfluorenyldimethyltitanium; methylene (tertbutylcyclopentadienyl)(cyclopentadienyl) dimethyltitanium;
methylene(cyclopentadienyl)(indenyl)dimethyltitanium;
ethylidene(cyclopentadienyl)(indenyl)dimethyltitanium;
dimethylsilyl(cyclopentadienyl)(indenyl)dimethyltitanium;
methylene(cyclopentadienyl)(fluorenyl)dimethyltitanium;
ethylidene(cyclopentadienyl)(fluorenyl)dimethyltitanium;
dimethylsilyl(cyclopentadienyl)(fluorenyl) dimethyltitanium;
methylene(indenyl)(fluorenyl)dimethyltitanium;
ethylidene(indenyl)(fluorenyl)dimethyltitanium;
dimethylsilyl(indenyl)(fluorenyl)dimethyltitanium;
bis(cyclopentadienyl)dibenzyltitanium;
bis(tert-butylcyclopentadienyl)dibenzyltitanium;
bis(methylcyclopentadienyl)dibenzyltitanium;
bis(1,3-dimethylcyclopentadienyl)dibenzyltitaniu;
bis(1,2,4-trimethylcyclopentadienyl)dibenzyltitanium;
bis(1,2,3,4-tetramethylcyclopentadienyl)dibenzyltitanium;
bis(pentamethylcyclopentadienyl)dibenzyltitanium;
bis(trimethylsilylcyclopentadienyl)dibenzyltitanium;
bis[1,3-di-(trimethylsilyl)cyclopentadienyl] dibenzyltitanium;
bis[1,2,4-tri(trimethylsilyl)cyclopentadienyl] dibenzyltitanium;
bis(indenyl)dibenzyltitanium;
bis(fluorenyl)dibenzyltitanium;
methylenebis(cyclopentadienyl)dibenzyltitanium;
ethylidenebis(cyclopentadienyl)dibenzyltitanium;
methylenebis(2,3,4,5-tetramethylcyclopentadienyl) dibenzyltitanium;
ethylidenebis(2,3,4,5-tetramethylcyclopentadienyl) dibenzyltitanium;
dimethylsilylbis(2,3,4,5-tetramethylcyclopentadienyl) dibenzyltitanium;
methylenebis(indenyl)dibenzyltitanium;
ethylidenebis(indenyl)dibenzyltitanium;
dimethylsilylbis(indenyl)dibenzyltitanium;
methylenebis(fluorenyl)dibenzyltitanium;
ethylidenebis(fluorenyl)dibenzyltitanium;
dimethylsilylbis(fluorenyl)dibenzyltitanium;
methylene(cyclopentadienyl)(indenyl)dibenzyltitanium;
ethylidene(cyclopentadienyl)(indenyl)dibenzyltitanium;
dimethylsilyl(cyclopentadienyl)(indenyl)dibenzyltitanium;
methylene(cyclopentadienyl)(fluorenyl)dibenzyltitanium;
ethylidene(cyclopentadienyl)(fluorenyl)dibenzyltitanium;
dimethylsilyl(cyclopentadienyl)(fluorenyl) dibenzyltitanium;
methylene(indenyl)(fluorenyl)dibenzyltitanium;
ethylidene(indenyl)(fluorenyl)dibenzyltitanium;
dimethylsilyl(indenyl)(fluorenyl)dibenzyltitanium;
biscyclopentadienyltitanium dimethoxide;
biscyclopentadienyltitanium diethoxide;
biscyclopentadienyltitanium dipropoxide;
biscyclopentadienyltitanium dibutoxide;
biscyclopentadienyltitanium dipheoxide;
bis(methylcyclopentadienyl)titanium dimethoxide;
bis(1,3-dimethylcyclopentadienyl)titanium dimethoxide;
bis(1,2,4-trimethylcyclopentadienyl)titanium dimethoxide;
bis(1,2,3,4-tetramethylcyclopentadienyl)titanium dimethoxide;

bispentamethylcyclopentadienyltitanium dimethoxide;
bis(trimethylsilylcyclopentadienyl)titanium dimethoxide;
bis [1,3-di(trimethylsilyl)cyclopentadienyl]titanium dimethoxide;
bis [1,2,4-tri(trimethylsilyl)cyclopentadienyl]titanium dimethoxide;
bisindenyltitanium dimethoxide;
bisfluorenyltitanium dimethoxide;
methylenebiscyclopentadienyltitanium dimethoxide;
ethylidenebiscyclopentadienyltitanium dimethoxide;
methylenebis(2,3,4,5-tetramethylcyclopentadienyl)titanium dimethoxide;
ethylidenebis(2,3,4,5-tetramethylcyclopentadienyl)titanium dimethoxide;
dimethylsilylbis(2,3,4,5-tetramethylcyclopentadienyl) titanium dimethoxide;
methylenebisindenyltitanium dimethoxide;
methylenebis(methylindenyl)titanium dimethoxide;
ethylidenebisindenyltitanium dimethoxide;
dimethylsilylbisindenyltitanium dimethoxide;
methylenebisfluorenyltitanium dimethoxide;
methylenebis (methyl fluorenyl )titanium dimethoxide;
ethylidenebisfluorenyltitanium dimethoxide;
dimethylsilylbisfluorenyltitanium dimethoxide;
methylene(cyclopentadienyl)(indenyl)titanium dimethoxide;
ethylidene(cyclopentadienyl)(indenyl)titanium dimethoxide;
dimethylsilyl(cyclopentadienyl)(indenyl)titanium dimethoxide;
methylene(cyclopentadienyl)(fluorenyl)titanium dimethoxide;
ethylidene(cyclopentadienyl)(fluorenyl)titanium dimethoxide;
dimethylsilyl(cyclopentadienyl)(fluorenyl)titanium dimethoxide;
methylene(indenyl)(fluorenyl)titanium dimethoxide;
ethylidene(indenyl)(fluorenyl)titaniumim dimethoxide;
dimethylsilyl(indenyl)(fluorenyl)titanium dimethoxide,
isopropylidene(cyclopentadienyl)(fluorenyl)titanium dichloride, and
isopropylidene(cyclopentadienyl)(fluorenyl)titanium dimethoxide.

Examples of the transition metal compounds represented by the formula (V) wherein M is zirconium include ethylidenebiscyclopentadienylzirconium dichloride, ehylidenbiscyclopentadienylzirconium dimethoxide, dimethylsilylbiscyclopentadienylzirconium dimethoxide, isopropylidene (cyclopentadienyl)(fluorenyl)zirconium dichloride, etc. Examples of the hafnium compounds according to the general formula (V) include ethylidenebiscyclopentadienylhafnium dimethoxide, dimethylsilylbiscyclopentadienylhafnium dimethoxide, etc. Particularly desirable transition metal compounds among them are titanium compounds.

The transition metal compound as the component (A) of the catalyst according to the present invention may be used alone or in combination with at least one of them. In the case of the combined use, it is preferable that the transition metal compounds be properly selected on the basis of the chemical shift in $^{13}$C-NMR of the carbon in the methoxy group as the index when at least one u-bonded ligand in the transition metal compound is methoxized. Since the weight-average molecular weight of the styrenic polymer to be produced decreases with increase in the chemical shift value of the $^{13}$C-NMR, it is possible to set the range of the molecular weight distribution of the styrenic polymer to the desired value by properly selecting a plurality of transition metal compounds each having a different chemical shift value from one another.

The aluminoxane which is the component (B) of the polymerization catalyst is a compound obtained by bringing an organoaluminum compound into contact with a condensation agent, and includes a chain aluminoxane represented by the general formula (VI):

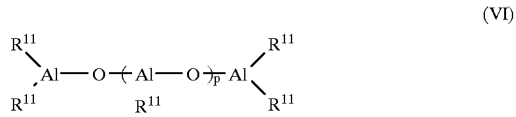

(VI)

wherein $R^{11}$ is an alkyl group having 1 to 20 carbon atoms, is preferably a methyl group and p is a number from 0 to 50, preferably 5 to 30; and a cyclic aluminoxane represented by the general formula (VII):

(VII)

Wherein $R^{11}$ is as previously defined and q is a number from 2 to 50, preferably 5 to 30.

The organoaluminum compound is exemplified by a trialkylaluminum such as trimethylaluminum, triethylaluminum and triisobutylaluminum, of which is preferable trimethylaluminum.

The condensation agent is typified by water and exemplified by an arbitrary substance which undergoes condensation reaction with a trialkylaluminum such as copper sulphate pentahydrate, water adsorbed in an inorganic or organic substance and so forth.

In general, the contact product of an organoaluminum compounds such as trialkylaluminum and water contains the above-mentioned chain alkylaluminoxane and cyclic alkylaluminoxane together with unreacted trialkylaluminum, various mixture of condensates and further the molecules resulting from association in an intricate manner thereof. Accordingly, the resultant contact product varies widely depending upon the conditions of contact of trialkylaluminum with water as the condensation agent.

The reaction of the alkylaluminum compound and water is not specifically limited in the above case but may be effected according to the publicly known methods, which are exemplified by (1) a method in which an organoaluminum compound is dissolved in an organic solvent an then brought into contact with water, (2) a method in which an organoaluminum compound is first added to the reaction system at the time of polymerization and thereafter water is added thereto, and (3) a method in which an organoaluminum compound is reacted with the water of crystallization contained in metal salts and the like, or the water adsorbed in inorganic or organic materials. The above-mentioned water may contain up to about 20% of ammonia, amine such as ethylamine, sulfer compound such as hydrogen sulfide, phosphorus compound such as phosphate, or the like. The abovementioned reaction proceeds even in the absence of a solvent but is preferably carried out in a solvent. Examples of the suitable solvent to be used here include aliphatic hydrocarbons such as hexane, heptane and decane, aromatic hydrocarbons such as benzene, toluene and xylene, and the like. The aluminoxane (e.g. an alkylaluminoxane) is preferably obtained by a method wherein the solid residue produced after contact reaction in the case of a water-containing compound being used is removed by means of filtration and the filtrate is heat treated under atmospheric or reduced pressure at 30 to 200° C., preferably 40 to 150° C. for 20 minutes to 8 hours, preferably 30 minutes to 5 hours while distilling away the solvent used.

The temperature in the aforementioned heat treatment may be pertiently determined according to the various conditions, but should be usually within the above-described range. The temperature lower than 30° C. fails to bring about the prescribed effect, whereas that exceeding 200° C. causes thermal decomposition of aluminoxane itself, each resulting in unfavorable consequence.

The reaction product is obtained in the form of colorless solid or solution depending upon the heat treatment conditions, and can be used as the catalyst solution by dissolving in or diluting with a hydrocarbon solvent according to the demand.

Suitable examples of the aluminoxane, that is, the contact product of organoaluminum compound and a condensation agent which is used as the component of the catalyst, especially an alkylaluminoxane are those in which the area of the high magnetic field component in the methyl proton signal region due to the aluminum-methyl group (Al-CH$_3$) bond as observed by the proton nuclear magnetic resonance method is not more than 50% of the total signal area. That is, in a proton nuclear magnetic resonance ($^1$H-NMR) spectral analysis of the alkylaluminoxane in toluene solvent at room temperature, the methyl proton signal due to Al-CH$_3$ is observed in the region of 1.0 to -0.5 ppm (tetramethylsilane (TMS) standard). Since the proton signal of TMS (0 ppm) is in the region of the methyl proton signal due to Al-CH$_3$, the methyl proton signal due to Al-CH$_3$ is measured with 2.35 ppm methyl proton signal of toluene in TMS standard. The methyl proton signal due to Al-CH$_3$ is divided into two comonents: the high magnetic field component in the -0.1 to -0.5 ppm region and the other magnetic field component in the 1.0 to -0.1 ppm region. In alkylaluminoxane preferably used as component (B) of the catalyst in the present invention, the area of the high magnetic field component is not more than 50%, preferably 45 to 5% of the total signal area in the 1.0 to -0.5 ppm region.

As the coordination complex compound comprising a cation and an anion in which a plurality of radicals are bonded to a metal, that is, the component (C) of the polymerization catalyst, there are preferably usable the coordination complex compounds represented by the following general formula (VIII) or (IX):

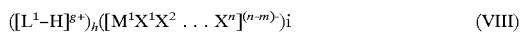   (VIII)

or

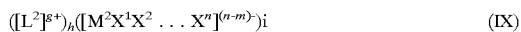   (IX)

wherein L$^2$ is M$^3$, R$^{12}$R$^{13}$M$^4$ or R$^{14}$$_3$C as hereinafter described; L$_1$ is a Lewis base; M$^1$ and M$^2$ are each a metal selected from Groups 5 to 15 of the Periodic Table; M$^3$ is a metal selected from Groups 8 to 12 of the Periodic Table; M$^4$ is a metal selected from Groups 8 to 10 of the Periodic Table; X$^1$ to X$^n$ are each a hydrogen atom, dialkylamino group, alkoxy group, aryloxy group, alkyl group having 1 to 20 carbon atoms, aryl group having 6 to 20 carbon atoms, alkylaryl group, arylalkyl group, substituted alkyl group, organometalloid group or halogen atom; R$^{12}$ and R$^{13}$ are each a cyclopetnadienyl group, substituted cyclopentadienyl group, indenyl group or fluorenyl group; R$^{14}$ is an alkyl group; m is the valency of each of M$^1$ and M$^2$, indicating an integer of 1 to 7; n is an integer of 2 to 8; g is the ion valency of each of [L$^1$-H] and [L$^2$], indicating an integer of 1 to 7; h is an integer of 1 or more; and i=hxg/(n-m).

Specific examples of M$^1$ and M$^2$ include B, Al, Si, P, As, Sb, etc.; those of M$^3$ include Ag, Cu, etc.; and those of M$^4$ include Fe, Co, Ni, etc. Specific examples of X$^1$ to X$^n$ include dialkylamino group such as dimethylamino and diethylamino; alkoxyl group such as methoxyl, ethoxyl and n-butoxyl; aryloxyl group such as phenoxyl, 2,6-dimethylpheoxyl and naphthyloxyl; alkyl group having 1 to 20 carbon atoms such as methyl, ethyl, n-propyl, iso-propyl, n-butyl, n-octyl and 2-ethylhexyl; aryl group having 6 to 20 carbon atoms, alkylaryl group or arylalkyl group such as phenyl, p-tolyl, benzyl, pentafluorophenyl, 3,5-di (trifluoromethyl)phenyl, 4-tert-butylphenyl, 2,6-dimethylphenyl, 3,5-dimethylphenyl, 2,4-dimethylphenyl and 1,2-dimethylphenyl; halogen such as F, Cl, Br and I; and organometalloid such as pentamethylantimony group, trimethylsilyl group, trimethylgermyl group, diphenylarsine group, dicyclohexylantimony group and diphenylboron group. Specific examples of substituted cyclopetnadienyl group of R$^{12}$ and R$^{13}$ include methylcyclopentadienyl, butylcyclopentadienyl and pentamethylcyclopentadienyl.

Among the compounds represented by the general formula (VIII) or (IX), specific examples of preferably usable compounds include, as the compound of general formula (VIII), triethylammonium tetraphenylborate, tri(n-butyl) ammonium tetraphenylborate, trimethylammonium tetraphenylborate, triethylammonium tetra (pentafluorophenyl)borate, tri(n-butyl)ammonium tetra (pentafluorophenyl)borate, triethylammonium hexafluoroarsenate, etc., and as the compound of general formula (IX), pyridinium tetra(pentafluorophenyl)borate, pyrrolinium tetra(pentafluorophenyl)borate, N,N-dimethylanilinium tetra(pentafluorophenyl)borate, methyldiphenylammonium tetra(pentafluorophenyl)borate, ferrocenium tetraphenylborate, dimethylferrocenium tetra (pentafluorophenyl)borate, ferrocenium tetra (pentafluorophenyl)borate, decamethylferrocenium tetra (pentafluorophenyl)borate, acetylferrocenium tetra (pentafluorophenyl)borate, formylferrocenium tetra (pentafluorophenyl)borate, cyanoferrocenium tetra (pentafluorophenyl)borate, silver tetraphenylborate, silver tetra(pentafluorophenyl)borate, trityl tetraphenylborate, trityl tetra(pentafluorophenyl)borate, silver hexafluoroarsenate, silver hexafluoroantimonate, silver tetrafluoroborate, etc.

On the other hand, various organometallic compounds are available as the component (D) of the polymerization catalyst, and exemplified by those represented by the general formula (X):

   (X)

wherein R$^{15}$ and R$^{16}$ each independently represent an alkyl group having 1 to 8 carbon atoms, preferably 1 to 4 carbon atoms; Y$^1$ represents a halogen; r, s, t and u are 0<r≦3, 0≦s<3 and 0≦t<3, respectively, and r+s+t+u= 3.

The activity of the catalyst is further improved by adding the above compound.

The organoaluminum compound represented by the above formula (X) can be exemplified as shown below. Those corresponding to t=u=o are represented by the formula: R$^{15}$$_r$Al(OR$^{16}$)$_{3-r}$ (wherein R$^{15}$ and R$^{16}$ are as previously defined and r is preferably a number of 1.5≦r≦3). Those corresponding to s=t=0 are represented by the formula: R$^{15}$AlY$^1$$_{3-r}$(wherein R$^{15}$ and Y$^1$ are as previously defined and r is preferably a number of 0<r<3). Those corresponding to s=u=0 are represented by the formula: R$^{15}$$_r$AlH$_{3-r}$(wherein R$^{15}$ is as previously defined and r is preferably a number of $2 \leq r < 3$). Those corresponding to $t=0$ are represented by the formula: $R^{15}_r Al(OR^{16})_s Y^1_u$ (wherein $R^{15}$, $R^{16}$ and $Y^1$ are as previously defined and $0 < r \leq 3$, $0 \leq s < 3$, $0 \leq u < 3$ and $r+s+u=3$.

In the organoaluminum compound represented by the formula (X), the compound wherein $t=u=0$ and $r=3$ is selected from, for example, trialkylaluminum such as triethylaluminum and tributylaluminum, or combination thereof, and those preferred are triethylaluminum, tri-n-butyl-aluminum and triisobutylaluminum. In the case of $t=u=o$ and $1.5 \leq r < 3$, included are dialkylaluminum alkoxide such as diethylaluminum ethoxide and dibutylaluminum butoxide; alkylaluminum sesquialkoxide such as ethylaluminum sesquiethoxide and butylaluminum sesquibutoxide; as well as partially alkoxylated alkylaluminum having an average composition represented by $R^{15}_{2.5} Al(OR^{16})_{0.5}$. Examples of the compound corresponding to the case where $s=t=0$ include a partially halogenated alkylaluminum including dialkylaluminum halogenide ($r=2$) such as diethylaluminum chloride, dibutylaluminum chloride and diethylaluminum bromide; alkylaluminum sesquihalogenide ($r=1.5$) such as ethylaluminum sesquichloride, butylaluminum sesquichloride and ethylaluminum sesquibromide; and alkylaluminum dihalogenide ($r=1$) such as ethylaluminum dichloride, propylaluminum dichloride and butylaluminum dibromide. Examples of the compound corresponding to the case in which $s=u=0$ includes a partially hydrogenated alkylaluminum including dialkylaluminum hydride ($r=2$) such as diethylaluminum hydride and dibutylaluminum hydride; alkylaluminum dihydride ($r=1$) such as ethylaluminum dihydride and propylaluminum dihydride. Examples of the compound corresponding to the case in which $t=0$ include a partially alkoxylated and halogenated alkylaluminum such as ethylaluminumethoxy chloride, butylaluminumbutoxy chloride and ethylaluminumethoxy bromide ($r=s=u=1$).

The catalyst to be used in the process of the present invention comprises the components (A), (B), (C) and (D). A variety of procedures are applicable to the preparation of the catalyst, including (1) a method in which the component (D) is added to the reaction product among the components (A), (B) and (C) to prepare the polymerization catalyst, which is brought into contact with monomer/s to be polymerized; (2) a method in which the components (B) and (C) are added to the reaction product between the components (A) and (D) to prepare the catalyst, which is brought into contact with monomer/s to be polymerized; and (3) a method in which the components (A), (B), (C) and (D) are added one by one to monomer/s to be polymerized to bring each of the components into contact with the monomer/s. There may be employed the reaction product among the components (A), (B) and (C) which has been isolated and purified in advance.

The addition and contact of each of the components (A), (B), (C) and (D) may be carried out, of course, at the polymerization temperature and besides at a temperature in the range of 0 to 100° C.

In producing the styrenic polymer according to the process of the present invention, at least one styrenic monomer such as styrene and/or a derivative thereof exemplified by alkylstyrene, alkoxy styrene, halogenated styrene, vinyl benzoate ester or the like is polymerized or copolymerized in the presence of the combined catalyst comprising the above-mentioned components (A), (B), (C) and (D). As described hereinbefore, there are available various methods of bringing the catalyst of the present invention into contact with the styrenic monomer.

The polymerization of the styrenic monomer may be carried out in bulk or in a solvent such as an aliphatic hydrocarbon exemplified by pentane, hexane and heptane; an alicyclic hydrocarbon exemplified by cyclohexane; or an aromatic hydrocarbon exemplified by benzene, toluene and xylene. The polymerization temperature is not specifically limited, but is usually 0 to 90° C., preferably 20 to 70° C.

For the purpose of modifying the molecular weight of the styrenic polymer to be produced, it is effective to proceed with the polymerization reaction in the presence of hydrogen.

The styrenic polymer obtained by the process according to the present invention has a high degree of syndiotactic configuration.

Here, the styrenic polymer which has a high degree of the syndiotactic configuration means that its stereochemical structure is mainly the syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having such a high degree of syndiotactic configuration" as mentioned in the present invention means polystyrene, poly(alkylstyrene), poly(halogenated styrene), poly(alkoxystyrene), poly(vinyl benzoate), the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. Poly (alkylstyrene) include poly(methylstyrene), poly (ethylstyrene), poly(isopropylstyrene), poly (tertbutylstyrene) etc., poly(halogenated styrene) include poly(chlorostyrene), poly(bromostyrene), poly (fluorostyrene), etc, and poly(alkoxystyrene) include poly (methoxystyrene), poly(ethoxystyrene), etc.

The most desirable styrene polymers among them are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

In summary, the process according to the present invention exhibits remarkable effect in that the range of the molecular weight distribution of the product styrenic polymer is expanded, since the incorporation of the organoaluminum compound causes the polymer portion produced by the aluminoxane to shift to the side of lower molecular weight without causing the polymer portion produced by the ion complex to shift to said side; the molecular weight distribution thereof can be regulated to a desired value by the use of a plurality of transition metal compounds; and the resultant polymer is minimized in residual metallic components even when deashing treatment is omitted. After all, highly syndiotactic styrenic polymer with a wide and arbitrary range of molecular weight distribution can be efficiently produced at a low production cost by the process according to the present invention.

In the following, the present invention will be described in more detail with reference to non-limitative examples.

EXAMPLE 1

In a 20 mL vessel which had been dried and purged with nitrogen were successively placed 10 mL of styrene and 15

μ mol of triisobutylaluminum, 10 μmol of methylaluminoxane, 0.50 μmol of dimethylanilinium tetra(pentafluorophenyl)borate(DMAB) and, 0.50 μmol of pentamethylcyclopentadienyltrimethyltitanium to proceed with polymerization at 70° C. for 4 hours. After the completion of the reaction, the reaction product was dried to afford 3.79 g of a polymer. The resultant polymer was cut into slices of 1 mm or less in thickness, which were subjected to Soxhlet extraction for 6 hours by the use of methyl ethyl ketone (MEK) as the solvent to produce MIP (MEK-insoluble portion). As the result, syndiotactic polystyrene (SPS) was obtained at a yield of 3.60 g. As the result of analysis by gel permeation chromatography, the SPS had a weight-average molecular weight (Mw)/number-average molecular weight (Mn) ratio (Mw/Mn) of 5.2.

EXAMPLE 2

In a 20 mL vessel which had been dried and purged with nitrogen were successively placed 10 mL of styrene and 15 μ mol of triisobutylaluminum, 100 μmol of methylaluminoxane, 0.50 μmol of dimethylanilinium tetra(pentafluorophenyl)borate(DMAB) and, 0.25 μmol of 1,2,3,4-tetramethylcyclopentadienyltrimethyltitanium to proceed with polymerization at 70° C. for 4 hours. After the completion of the reaction, the reaction product was dried to afford 3.11 g of a polymer. The resultant polymer was cut into slices of 1 mm or less in thickness, which were subjected to Soxhlet extraction for 6 hours by the use of methyl ethyl ketone (MEK) as the solvent to produce MIP (MEK-insoluble portion). As the result, syndiotactic polystyrene (SPS) was obtained at a yield of 3.16 g. As the result of analysis by gel permeation chromatography, the SPS had a weight-average molecular weight (Mw)/number-average molecular weight (Mn) ratio (Mw/Mn) of 8.3.

EXAMPLE 3

In a 20 mL vessel which had been dried and purged with nitrogen were placed 10 mL of styrene and 15 μmol of triisobutylaluminum, 100 μmol of methylaluminoxane, and 0.50 μmol of ferrocenium tetra(pentafluorophenyl)borate (FCB) and, after one (1) minute, were further added 0.25 μmol of pentamethylcyclopentadienyltitanium trimethoxide and 0.25 μmol of 1,2,3,4-tetramethylcyclopentadienyltitanium trimethoxide to proceed with polymerization at 70° C. for 4 hours. After the completion of the reaction, the reaction product was dried to afford 4.80 g of a polymer. The resultant polymer was cut into slices of 1 mm or less in thickness, which were subjected to Soxhlet extraction for 6 hours by the use of methyl ethyl ketone (MEK) as the solvent to produce MIP (MEK-insoluble portion). As the result, syndiotactic polystyrene (SPS) was obtained at a yield of 4.68 g. As the result of analysis by gel permeation chromatography, the SPS had a weight-average molecular weight (Mw)/number-average molecular weight (Mn) ratio (Mw/Mn) of 13.2.

What is claimed is:

1. A process for producing a styrenic polymer which comprises polymerizing at least one styrenic monomer by the use of a polymerization catalyst comprising in combination (A) a plurality of transition metal compounds, (B) an aluminoxane, (C) a coordination complex compound comprising a cation and an anion in which a plurality of radicals are bonded to a metal and (D) an organoaluminum compound, and wherein at least one of said transition metal compounds (A) is:

TiRXYZ     (III)

wherein R represents a cyclopentadienyl group, a substituted cyclopentadienyl group or an indenyl group; X, Y, and Z, independently of one another, are a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom; or:

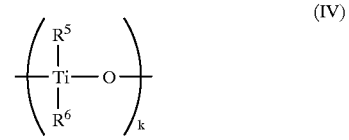
(IV)

wherein $R^5$ and $R^6$ each represent a halogen atom, an alkoxy group having 1 to 20 carbon atoms or an acyloxy group; and k is an integer from 2 to 20; and wherein component (A) is present in an amount between 0.25 μmol and 0.5 μmol and component (B) is present in an amount of between 10 μmol and 100 μmol per 10 mL of styrenic monomer.

2. The process according to claim 1 where the aluminoxane is an alkylaluminoxane.

3. A catalyst for polymerizing a styrenic monomer into a syndiotactic polystyrene which comprises in combination (A) a plurality of transition metal compounds, (B) an aluminoxane, (C) a coordination complex compound comprising a cation and an anion in which a plurality of radicals are bonded to a metal and (D) an organoaluminum compound, and wherein at least one of said transition metal compounds (A) is:

TiRXYZ     (III)

wherein R represents a cyclopentadienyl group, a substituted cyclopentadienyl group or an indenyl group; X, Y, and Z, independently of one another, are a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom; or:

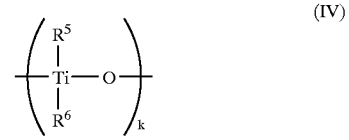
(IV)

wherein $R^5$ and $R^6$ each represent a halogen atom, an alkoxy group having 1 to 20 carbon atoms or an acyloxy group; and k is an integer from 2 to 20; and wherein component (A) is present in an amount between 0.25 μmol and 0.5 μmol and component (B) is present in an amount of between 10 μmol and 100 μmol per 10 mL of styrenic monomer to be polymerized.

4. The process as claimed in claim 2, wherein at least one of said transition metal compounds (A) is a compound of formula III.

5. The catalyst as claimed in claim 3, wherein at least one of said transition metal compounds (A) is a compound of formula III.

* * * * *

UNITED STATES PATENT AND TRADEMARK OFFICE
CERTIFICATE OF CORRECTION

PATENT NO. : 5,905,126

DATED : May 18, 1999

INVENTOR(S): Norio TOMOTSU, et al.

It is certified that an error appears in the above-identified patent and that said Letters Patent is hereby corrected as shown below:

On the title page, item [63], the Related U.S. Application Data should be:

Related U.S. Application Data

--[63] Continuation of application No. 08/612,077, Mar. 7, 1996, Pat. No. 5,786,433, which is a continuation of application No. 08/131,616, Oct. 5, 1993, abandoned.--

Signed and Sealed this

Thirtieth Day of May, 2000

Attest:

Q. TODD DICKINSON

*Attesting Officer*　　　　*Director of Patents and Trademarks*